United States Patent
Rottmann

[11] Patent Number: 6,145,407
[45] Date of Patent: Nov. 14, 2000

[54] CLICK-STOP GEAR SHIFT FOR BICYCLES

[75] Inventor: Franz Rottmann, Schweinfurt, Germany

[73] Assignee: SRAM Deutschland GmbH, Schweinfurt, Germany

[21] Appl. No.: 09/132,172

[22] Filed: Aug. 11, 1998

[30] Foreign Application Priority Data

Aug. 11, 1997 [DE] Germany .............................. 197 34 685

[51] Int. Cl.⁷ .................................................. B62K 23/04
[52] U.S. Cl. ............................................. 74/502.2; 74/527
[58] Field of Search .................................. 74/527, 502.2, 74/489, 473.14, 473.28

[56] References Cited

U.S. PATENT DOCUMENTS

| | | | |
|---|---|---|---|
| 5,524,501 | 6/1996 | Patterson et al. | 74/527 X |
| 5,588,925 | 12/1996 | Arbeiter et al. | |
| 5,662,000 | 9/1997 | Patterson et al. | 74/527 X |
| 5,676,020 | 10/1997 | Jordan et al. | 74/502.2 X |
| 5,750,947 | 5/1998 | Rao et al. | 200/6 |

FOREIGN PATENT DOCUMENTS 676 325   10/1995   European Pat. Off. .

*Primary Examiner*—Mary Ann Green
*Attorney, Agent, or Firm*—Cohen, Pontani, Lieberman & Pavane

[57] ABSTRACT

A click-stop gear shift with a detent spring in a housing. The detent spring has a projection which engages notches defined in a rotary member connected to a rotary handle. The detent spring has an outer and an inner spring portions which, together with an arcuate portion, form a curved shape. The inner spring portion is supported by a support member. By selectively positioning the support member along the inner spring portion, the stiffness of the detent spring can be changed. The ability of the relatively long spring portion to vibrate allows a desirable noise to be produced that serves as an acoustic confirmation of the gear shifting movement for the user.

10 Claims, 3 Drawing Sheets

CLICK-STOP GEAR SHIFT FOR BICYCLES

BACKGROUND OF THE INVENTION

1. Field of the Invention

The invention relates to a click-stop gear shift, especially a rotary handlebar gear shift for shifting bicycle gears.

2. Background of the Invention

EP 676 325 A2 discloses a detent spring that has a radially inwardly directed base part with two ends, and also has a free arm, the end of which has a projection for engagement with notches of a rotary member. The detent spring rests with its two radially inward ends in a recess of the housing. As a result of engaging the notches of the rotary member the free am is able to swing and, during rotation of the rotary member, can snap from one notch into the other. The length of the free arm, from the first end to the projection, is relatively short, so that the spring stiffness increases steeply.

SUMMARY OF THE INVENTION

The present invention proposes a detent spring in which the spring rate increases less steeply. This is attained by means of a spring that has a substantially longer free, springing part between the projection and the closest support. In roughly the same space conditions in the housing, the hairpin-shaped spring can be moved along a spring path, by means of the spring portions arranged one over the other, with approximately constant forces. The amount of force applied between the projection and the notches in the rotary member can thus be varied by moving a support member from the first spring end to directly below the projection. Further, it is advantageously possible to attain a dead travel space upon operation of the rotary member. This is achieved either by means of a hook at one end of the spring disposed in a recess provided for the hook in the housing, or by arranging two stops in the housing.

Finally, because of the ability of the long, freely swinging spring portions of the detent spring to freely vibrate, an audible noise occurs when the projection snaps into the notches of the rotary member. This noise is highly desirable, because it provides acoustic confirmation of the shifting of gears to the bicycle rider.

The object of the invention is thus to create a detent spring for a click-stop gear shift, especially a rotary handlebar gear shift for bicycle gears, having a projection which can engage the notches in the rotary member with sufficiently great force, whereby the force chances only gradually over the spring path. All required force adjustments during operation are to be made by simply adjusting the position of a support member relative to the spring portions so that clearly audible noise occurs when the rotary member is operated.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
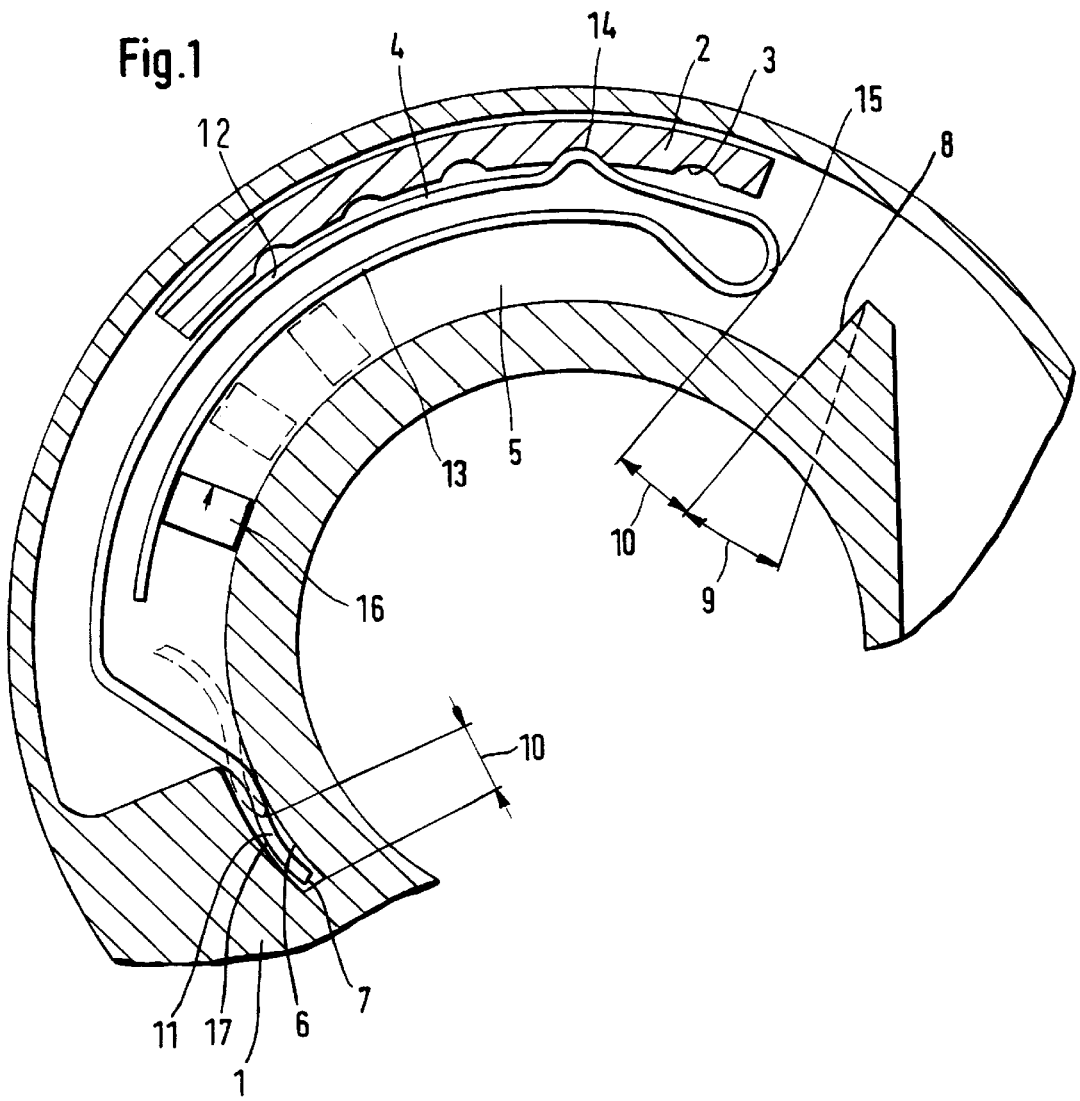
FIG. 1 is a partial sectioned view of an embodiment of a rotary gear shift having a housing, a rotary member and a detent spring with a support member constructed in accordance within the present invention.

FIG. 1 shows a preferred embodiment of click-stop gear shift comprising a housing 1 having an outer circumferential wall, a rotary member 2 having notches 3 formed therein, and a detent spring 4 configured in the form of a curved hairpin and has an arcuate portion 15. Each of the notches 3 corresponds to a gear-shifting position. The detent spring 4 is arranged in a substantially annular space 5 of the housing 1. The housing 1 has a recess 6, into which a spring end 11 engages, while the detent sprig 4, in the installed states rests on the radially outer flank of the recess which serves as am abutment 17. The detent spring 4 has a concentrically disposed outer spring portion 12 and an inner spring portion 13 disposed substantially parallel thereto, and these spring portions 12, 13 are connected via the arcuate portion 15. Arranged at the outer spring portion 12 is a projection 14, which releasably engages the notches 3 in the rotary member 2. To provide the requisite spring force to the projection 14 in the notches 3, there is a support member 16 configured and connected to the housing 1 so as to serve as a third support for the detent spring 4 with its inner spring portion 13 in contact engagement with the support member 16. The support member 16 can be placed at any desired location of the inner spring portion 12 so as to ensure that adequate pressure force is applied in any given case to press the projection 14 against the notches 3 and to adjust the stiffness of the detent spring 4. The rotary member 2 is directly connected to a rotary handle (not shown), so that the rider using this rotary handle can feel the projection 14 slipping out of one notch 3 and clicking into an adjacent notch 3. To facilitate shifting, especially the shifting of chain gears from a smaller to a larger gearwheel, a certain override path is required. This path corresponds to a dead travel space 10, which is created when the detent spring 4 is moved in the clockwise direction Before the projection 14 is disengaged from the notch 3, the detent spring 4 is taken along by the rotary member 2 until the detent spring 4 passes through the dead travel space 10 between the arcuate portion 15 and a stop S in the annular space 5 of the housing 1. In the rest position of the detent spring 4, the spring end 11 hits a stop 7 in the recess 6. In other words, the dead travel space 10 is used only during rotation of the rotary member 2 in the clockwise direction. If, on the other hand, the rotary element 2 is rotated in the counterclockwise direction, the projection 14 moves to the adjacent notch 3 of the rotary member 2 immediately and without using the dead travel space. During movement in the clockwise direction, the arcuate portion 15 moves toward the stop 8. The projection 14 is therefore removed from the notch 3 while the arcuate portion 15 slides simultaneously along the stop 8. It is advantageous to configure the stop 8 in such a way that the friction of the arcuate portion 15 on the stop 8 does not exceed a certain level. For this reason, the contour of the stop 8 does not follow an ideal radius, but instead has an edge inclined at a certain angle 9 from this, so as to optimize the gear shifting process by superimposing a deliberate friction component.

Figure 2:
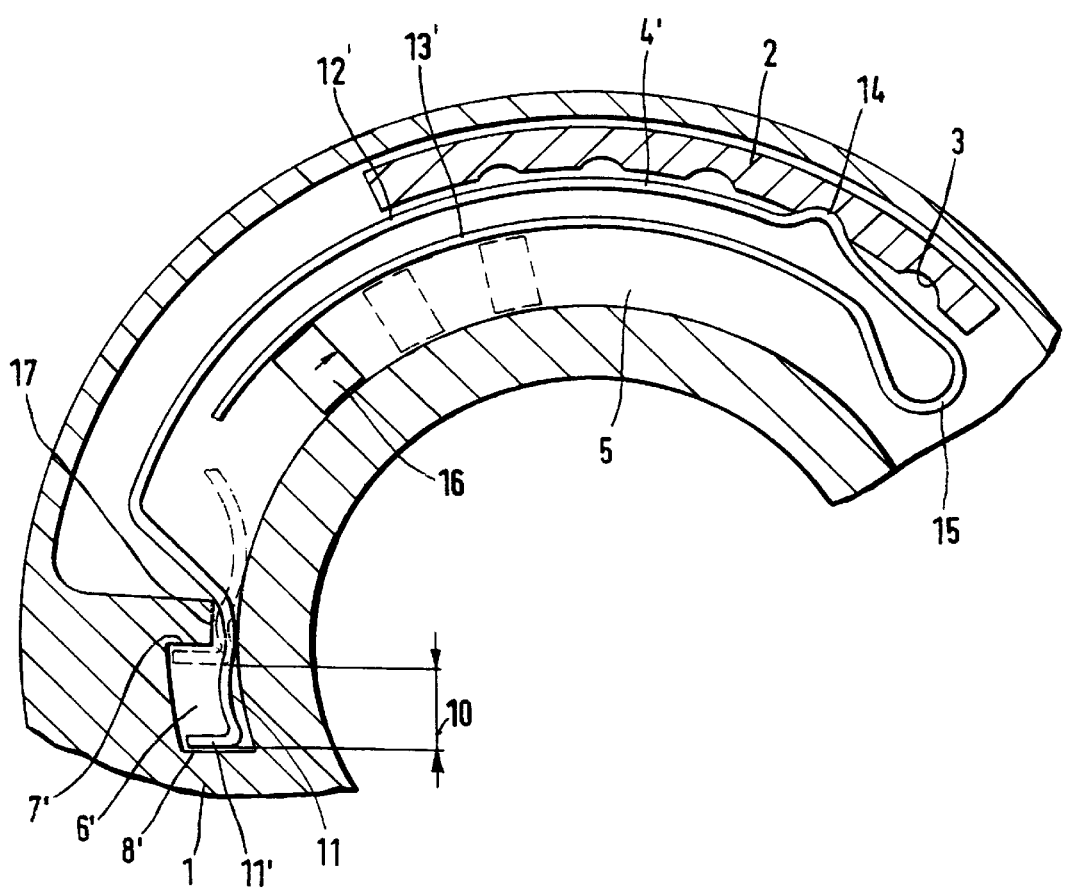
FIG. 2 is a partial sectioned view of the detent spring of FIG. 1, but with a hook disposed in a recess of the housing.

FIG. 2 shows another embodiment of the gear shift wherein, the detent spring 4 has been modified in the area of the spring end 11. The detent spring 4' of this embodiment is identical to the detent spring 4 of FIG. 1 with respect to the inner spring portion 13' and outer spring portion 12', but, unlike the embodiment of FIG. 1, detent spring 4' has a bent hook 11' at the spring end 11. The hook 11' extends into a modified recess 6' that has a first stop 7' and a second stop 8'. The distance between the stops 7', 8' is selected such that the detent spring 4' is allowed a dead travel space 10 as the hook is moved therebetween by, for example, striking the stops 7', 8' in an alternating manner.

Figure 3:
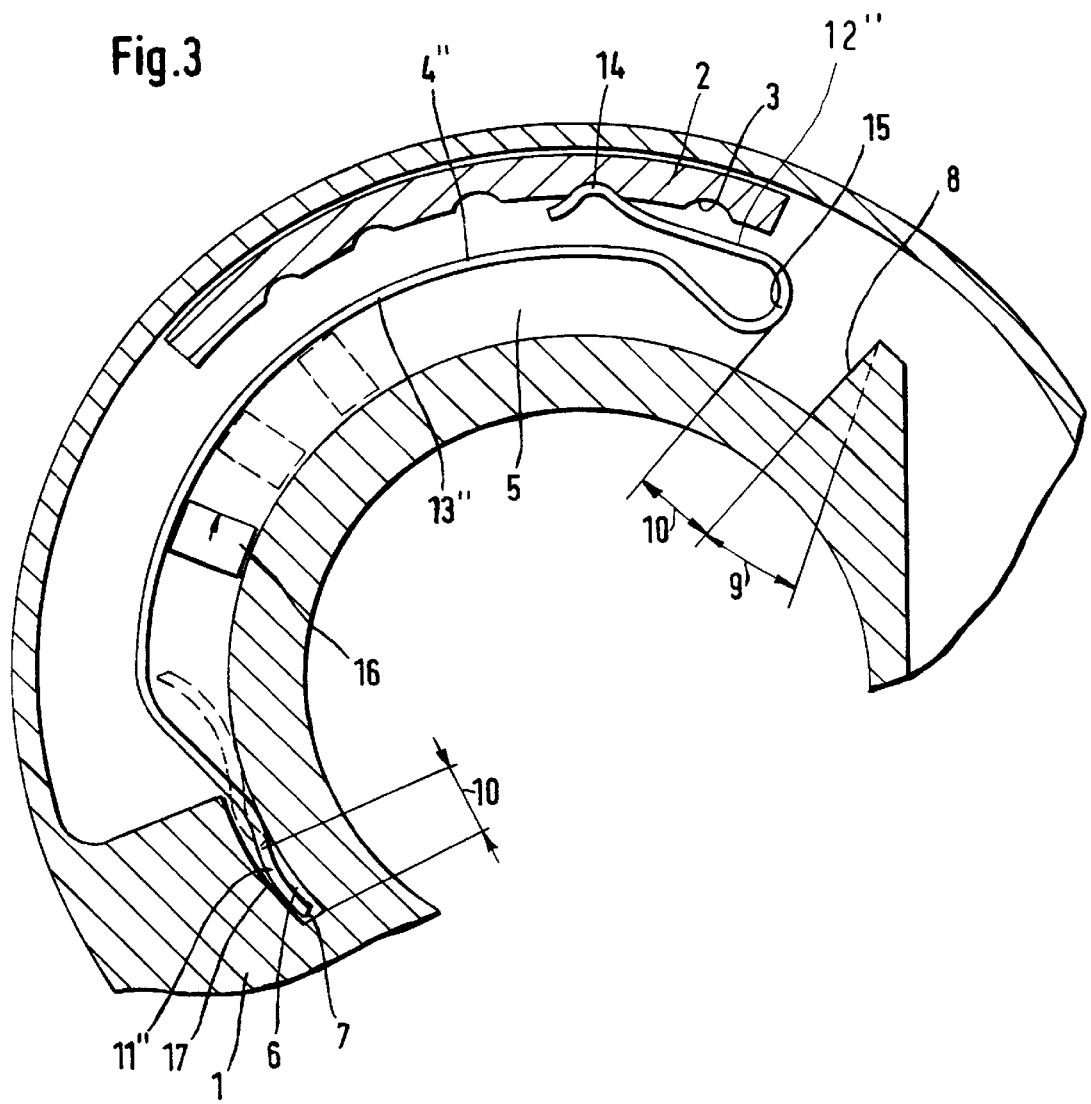
FIG. 3 is a partial sectioned view of a detent spring with the inner spring portion fixed in the recess and an outer spring portion that ends at the projection.

FIG. 3 shows another embodiment wherein the detent spring 4" has been modified in such a way that the outer spring, portion 12" extends between the projection 14 and the arcuate portion 15, such that the detent spring 4" ends directly behind the projection 14. An inner spring portion 13" rests on the support member 16, before the spring end 11" of the inner spring portion 13" ends on the abutment 17 in the recess 6. The dead travel space of the detent spring 4" is identical to that of the detent spring 4 of FIG. 1 between the curve 15 and the stop 8 in the substantially annular space 5. Like the detent spring 4' of FIG. 2, the detent spring 4" in this embodiment has a hook 11' that moves back and forth in the recess 6 between the stops 7, 8 so as to produce the dead travel space 10.

To meet different requirements for the rotary handlebar gear shift in different types of bicycles while using one and the same spring 4 or 4' or 4", different pressures are produced to press the projection 14 against the notches 3 in the rotary member 2. For this purpose, the support member 16 is moveable from the end of the inner spring portion 13, 13' or 13" clockwise toward the arcuate portion 15. As a result, the free (i.e. unsupported) length of the spring between the projection 15 and the contact point on the support member 16 becomes shorter and shorter. Consequently, the spring rate of the detent spring 4, 4", 4" increases, and the force needed to detach or disengage the projection 14 from the notch 3 increases as well.

Another advantage of the arrangement of the detent spring 4, 4', 4" is that the inventive gear shift provides audible sounds during gear shifting. This is particularly possible in the case of the detent springs 4 and 4' because a loud noise emanates from the especially long spring portions 12, 12' and 13, 13'. Although this applies to a lesser extent to the detent spring 4", due to the shortening of the outer spring portions 12", the detent spring 4" can be advantageous in realizing gear shifts which require deliberately high shifting forces upon rotation of the rotary member 2.

The invention is not limited by the embodiments described above which are presented as examples only but can be modified in various ways within the scope of protection defined by the appended patent claims.

I claim:

1. A click-stop gear shift for shifting bicycle gears, comprising:

a housing having an outer circumferential wall and a substantially annular space therewithin;

a selectively moveable rotary member disposed within the substantially annular space and adjacent the outer circumferential wall, said rotary member having a plurality of notches defined along its elongated body, each of said plurality of notches corresponding to a gear shift position;

a detent spring having an outer spring portion disposed adjacent the rotary member, an inner spring portion spaced radially inward of the outer spring portion, each of said outer and said inner spring portions having a first end, said detent spring further including an arcuate portion connecting said first ends of the outer and inner spring portions, said outer spring portion having a projection configured for releasable engagement with each of said plurality of notches of said rotary member; and a support member for adjusting a spring rate of said detent spring so as to vary pressure applied by said projection of said detent spring against said plurality of notches of said rotary member, said support member being disposed in said substantially annular space of said housing and selectively positionable along one of said inner and outer spring portions.

2. The click-stop gear shift of claim 1, wherein said one of the outer and inner spring portions is the inner spring portion.

3. The click-stop gear shift of claim 1, wherein the support member is selectively moveable along an entire length of the inner spring portion.

4. The click-stop gear shift of claim 1, and wherein the inner spring portion has a second end and is supported by the support member, said outer spring portion extending only between the arcuate portion and the projection.

5. The click-stop gear shift of claim 1, wherein the detent spring is made of a spring strip material having a rectangular cross-section.

6. The click-stop gear shift of claim 1, wherein the housing defines a recess, and one of the outer and inner spring portions has a second end moveable in a tangential direction but radially supported in the recess of the housing thereby forming an abutment.

7. The click-stop gear shift of claim 6, wherein the detent spring is arranged in the substantially annular space of the housing, the housing having a first stop disposed at one end of the recess for stopping the second end of the outer spring portion from moving therebeyond, and a second stop disposed adjacent the arcuate portion of the detent spring for stopping the arcuate portion of the detent spring from moving therebeyond, whereby a back-and-forth movement of the rotary member creates a dead travel space.

8. The click-stop gear shift of claim 7, wherein the second stop has a surface inclined at an angle.

9. A click-stop gear shift for shifting bicycle gears, comprising:

a housing having an outer circumferential wall and a substantially annular space therewithin;

a selectively moveable rotary member disposed within the substantially annular space and adjacent the outer circumferential wall, said rotary member having a plurality of notches defined along its elongated body, each of said plurality of notches corresponding to a gear shift position; and a detent spring having an outer spring portion disposed adjacent the rotary member, an inner spring portion spaced radially inward of the outer spring portion, each of said outer and said inner spring portions having a first end, said detent spring further including an arcuate portion connecting said first ends of the outer and inner spring portions, said outer spring portion having a projection configured for releasable engagement with each of said plurality of notches of said rotary member, wherein the housing defines a recess, and said outer spring portion has a second end moveable in a tangential direction but radially supported in the recess of the housing thereby forming an abutment.

10. A click-stop gear shift for shifting bicycle gears, comprising:
- a housing having an outer circumferential wall and a substantially annular space therewithin;
- a selectively moveable rotary member disposed within the substantially annular space and adjacent the outer circumferential wall, said rotary member having a plurality of notches defined along its elongated body, each of said plurality of notches corresponding to a gear shift position; and
- a detent spring having an outer spring portion disposed adjacent the rotary member, an inner spring portion spaced radially inward of the outer spring portion, each of said outer and said inner spring portions having a first end, said detent spring further including an arcuate portion connecting said first ends of the outer and inner spring portions, said outer spring portion having a projection configured for releasable engagement with each of said plurality of notches of said rotary member, wherein the housing has a recess defined by a first and a second stop, and the outer spring portion of the detent spring has a second end formed with a hook, the hook extending into the recess and being movable between the first and the second stops so as to create a dead travel space.

* * * * *